United States Patent
Xu et al.

(10) Patent No.: US 11,835,407 B2
(45) Date of Patent: Dec. 5, 2023

(54) DEVICE AND METHOD FOR ULTRASONIC DETECTING OF MECHANICAL MEMBER BASED ON MAGNETIC FLUID COUPLING

(71) Applicant: BEIJING INSTITUTE OF TECHNOLOGY, Beijing (CN)

(72) Inventors: Chunguang Xu, Beijing (CN); Shuangyi Li, Beijing (CN); Yuren Lu, Beijing (CN); Peng Yin, Beijing (CN); Dezhi Li, Beijing (CN); Wenyuan Song, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 197 days.

(21) Appl. No.: 17/377,162

(22) Filed: Jul. 15, 2021

(65) Prior Publication Data
US 2022/0026292 A1    Jan. 27, 2022

(30) Foreign Application Priority Data

Jul. 23, 2020    (CN) .......................... 202010719695.4

(51) Int. Cl.
*G01N 29/14* (2006.01)
*G01L 1/25* (2006.01)
*G01N 29/24* (2006.01)

(52) U.S. Cl.
CPC .............. *G01L 1/255* (2013.01); *G01N 29/14* (2013.01); *G01N 29/24* (2013.01); *G01N 2291/101* (2013.01)

(58) Field of Classification Search
CPC ........ G01L 1/255; G01N 29/14; G01N 29/24; G01N 2291/101; G01N 29/04; G01N 29/226; G01N 29/28; G01M 5/0066
See application file for complete search history.

(56) References Cited

U.S. PATENT DOCUMENTS 11,680,858 B2 *  6/2023  Xu .......................... G01N 29/27
                                                                   73/597
2010/0212427 A1   8/2010  Heck
(Continued)

FOREIGN PATENT DOCUMENTS

CN           1109594 A      10/1995
CN         102788847 A      11/2012
(Continued)

OTHER PUBLICATIONS

SU1281991_English translation (Year: 1987).*

*Primary Examiner* — Xin Y Zhong
(74) *Attorney, Agent, or Firm* — Shumaker, Loop & Kendrick, LLP

(57) ABSTRACT

A device and a method for ultrasonic detecting a mechanical member based on magnetic fluid coupling. The device comprises a magnetic field generating apparatus, magnetic fluid and an ultrasonic probe. The magnetic field generating apparatus has a cylindrical structure, into which the magnetic fluid is injected, where an upper portion of the apparatus is provided with the ultrasonic probe a front end that vertically extends into a liquid level of the magnetic fluid, and a bottom portion of the apparatus covers a detected position of a member under detection. The magnetic fluid at least contains magnetic suspension particles and oil-based or water-based liquid. With the device and the method, the ultrasonic probe is coupled with the member under detection to realize ultrasonic detecting of the service stress of the member under detection.

8 Claims, 1 Drawing Sheet

(56) References Cited

U.S. PATENT DOCUMENTS

2016/0153847 A1 6/2016 May
2018/0284072 A1* 10/2018 Pfortje ................. G01N 29/225

FOREIGN PATENT DOCUMENTS

| CN | 102865954 | A |   | 1/2013 |
|----|-----------|---|---|--------|
| CN | 106679872 | A |   | 5/2017 |
| CN | 107219303 | A |   | 9/2017 |
| CN | 206876640 | U |   | 1/2018 |
| CN | 108412894 | A |   | 8/2018 |
| CN | 109759307 | A |   | 5/2019 |
| CN | 109991562 | A |   | 7/2019 |
| SU | 1281991   | A | * | 1/1987 |

* cited by examiner

DEVICE AND METHOD FOR ULTRASONIC DETECTING OF MECHANICAL MEMBER BASED ON MAGNETIC FLUID COUPLING

CROSS-REFERENCE TO RELATED APPLICATIONS

This application claims priority to China Patent Application Serial No. 202010719695.4 filed Jul. 23, 2020, the entire disclosure of which is herein incorporated by reference.

BACKGROUND

Field

The disclosure relates generally to the field of mechanical service stress detection, and in particular to a device and a method for ultrasonic detecting of a mechanical member based on magnetic fluid coupling.

Discussion of the Related Art

Compared with other nondestructive detection, ultrasonic detection has the characteristics of strong penetrability, wide application range, high sensitivity and the like. The ultrasonic detection is often classified into a contact method and a liquid immersion method according to the coupling manner. In the detection process of the liquid immersion method, liquid is used as a couplant. The couplant can improve the sound energy transmission between the probe and the member under detection, and can reduce possible abrasion of the probe and the member under detection in the detection process. Common couplants such as water are easy to run off when the member under detection is a curved surface. If the couplant is glycerin, it needs to be diluted, by which corrosion pits are easily formed on the surface of the member under detection.

Magnetic fluid as a colloidal solution has the advantages of being not easy to generate precipitates and being capable of stably existing for a long time, includes the characteristics of liquid and has magnetism at the same time. Therefore, the magnetic fluid is considered to be used as the couplant, and the magnetic transducer is used, so that the loss of the couplant in the detection process can be reduced. The magnetic fluid contains fine magnetic particles, has higher density compared with the couplants such as water and the like, has better sound transmission, cannot cause loss of the couplant when the member under detection is not planar, can keep a more compact attaching of a coupling layer to the probe and the surface of the member under detection compared with the couplants such as oil and the like, can also ensure that the thickness of the coupling layer is kept constant, and is more favorable for ultrasonic detection. Therefore, using of the magnetic fluid as the ultrasonic couplant has good application significance, and can solve some problems of the common couplants.

Patent document CN206876640U discloses a spatially scanning magnetic fluid sealed partial immersion ultrasonic detector, which is composed of a spatial scanning unit and a local water immersion type ultrasonic flaw detection unit. A magnetic induction coil is electrified to form magnetic force to fix a magnetic fluid, so that the magnetic fluid is completely in contact with the surface of a member under detection and a sealing ring is formed. Water is then injected into a cavity sealed by the magnetic fluid to realize water immersion detection. In this patent, the magnetic fluid is mainly used to seal the cavity, which reduces the loss of water as a couplant in the detection process, and the magnetic fluid is not used as a couplant at this time. Therefore, according to the above research on the couplant, it is necessary to design a corresponding detection device and method for the case of the magnetic fluid as the couplant.

SUMMARY

In view of the above problems, the present disclosure provides a device and a method for ultrasonic detecting of mechanical member based on magnetic fluid coupling.

The present disclosure provides a device for ultrasonic detecting of mechanical member based on magnetic fluid coupling, which comprises: a magnetic field generating apparatus, magnetic fluid and an ultrasonic probe;

the magnetic field generating apparatus has a cylindrical structure, into which the magnetic fluid is injected, wherein a upper portion of the apparatus is provided with the ultrasonic probe a front end that vertically extends into a liquid level of the magnetic fluid, and a bottom portion of the apparatus covers a detected position of a member under detection; and the magnetic fluid at least contains magnetic suspension particles and oil-based or water-based liquid.

From the above, the magnetic field generating apparatus generates a stable magnetic field in the cylindrical structure, so that the magnetic suspension particles of the magnetic fluid are attracted and attached to the front end of the ultrasonic transducer of the ultrasonic probe and do not fall off therefrom, which reduces the ultrasonic propagation loss between the ultrasonic transducer of the ultrasonic probe and the magnetic fluid; and meanwhile, the magnetic suspension particles of the magnetic fluid improve the density of the magnetic fluid, improve the sound permeability of the magnetic fluid and reduce the ultrasonic transmission loss.

Wherein, the device further comprises a flexible fence for sealing the bottom portion of the magnetic field generating apparatus, by which the detected position of the member under detection is covered, wherein the flexible fence is made of soft sound-transmitting materials.

From the above, the flexibility of the flexible fence ensures that the flexible fence is tightly combined with the detected position, the sound permeability of the flexible fence can also ensure the propagation of ultrasonic waves in the flexible fence, and in conjunction with that the magnetic suspension particles of the magnetic fluid are attracted and attached to the front end of the ultrasonic transducer of the ultrasonic probe and do not fall off therefrom, magnetic fluid coupling between the ultrasonic probe and the member under detection is thus realized. Meanwhile, the sealing keeps the magnetic fluid from leaking, which ensures the stability of the detection and realizes ultrasonic detecting of the dynamic member.

Wherein, the front end of the ultrasonic probe is provided with an acoustic impedance matching layer that is consistent with or close to the acoustic impedance of the magnetic fluid.

From the above, the propagation loss between the ultrasonic probe and the magnetic fluid is reduced, the signal-to-noise ratio of ultrasonic propagation is improved, and the accuracy of the detection is improved.

Wherein, the magnetic field generating apparatus comprises a cylindrical permanent magnet frame.

From the above, the permanent magnet frame provides a semi-closed magnetic field in the magnetic field generating apparatus, so that the magnetic particles of the magnetic fluid with the protruded surface are attracted and attached to the front end of the ultrasonic probe and do not fall off therefrom, which reduces the transmission loss of the ultrasonic waves at the interface between the front end of the ultrasonic probe and the magnetic fluid, and improves the stability and the accuracy of the detection.

Wherein, the inner wall of the magnetic field generating apparatus is matched in shape with the front end of the ultrasonic probe.

From the above, the inner wall of the magnetic field generating apparatus is matched in shape with the front end of the ultrasonic probe, so that the magnetic fluid is enclosed in a circular ring or a rectangular frame without leakage, which improves the stability of the detection.

Wherein, the magnetic field generating apparatus has a depth of 1-5 mm, and the depth can be adjusted according to the intensity of the magnetic field generated by the magnetic field generating apparatus.

From the above, the depth of the magnetic field generating apparatus is used to ensure sufficient magnetic strength of the semi-closed magnetic field.

Wherein, the curvature of the bottom portion of the magnetic field generating apparatus is matched with the curvature of the corresponding position of the member under detection.

From the above, the curvature of the bottom portion of the magnetic field generating apparatus is matched with the curvature of the member under detection, which ensures the tightness of the flexible fence to the magnetic field generating apparatus, keeps the magnetic fluid from leaking, and improving the stability of the detection.

Wherein, the magnetic fluid contains thickeners.

From the above, the thickeners increase the density of the magnetic fluid, reduce the loss of ultrasonic propagation and improve the accuracy of the ultrasonic detection.

Wherein, the periphery of the flexible fence extends upwards along the outer wall of the magnetic field generating apparatus and tightly surrounds the lower half part of the outer wall of the magnetic field generating apparatus.

From the above, the extended portion of the flexible fence secures the magnetic field generating apparatus and thus the whole device, which maintains stability of the detection when the member moves.

In the present disclosure, the magnetic field of the magnetic field generating apparatus is used to enable the magnetic fluid to be attracted and attached by the acoustic reactance matching layer at the front end of the ultrasonic probe and to be tightly fitted to the acoustic reactance matching layer, and the flexible fence is tightly combined with the detected position, thereby realizing magnetic fluid coupling between the ultrasonic probe and the member under detection. The ultrasonic probe sends ultrasonic waves that are transmitted to the detected position of the member under detection through the magnetic fluid and the flexible fence, and the ultrasonic probe detects ultrasonic echoes refracted critically by the inside of the member under detection, thus realizing the ultrasonic nondestructive detecting of the mechanical member.

The present disclosure also provides a method for ultrasonic detecting of mechanical member based on magnetic fluid coupling, which comprises the following steps:

placing a member under detection vertically below the bottom portion of the flexible fence of the device for ultrasonic detecting of mechanical member based on magnetic fluid coupling, wherein the detected position is closely aligned with the bottom portion of the flexible fence;

making the member under detection to move or stand still according to detection requirements; and transmitting ultrasonic waves by the ultrasonic probe and detecting, by the ultrasonic probe, ultrasonic echoes refracted critically by the member under detection to calculate the service stress of the member under detection.

Calculating of detection parameters such as internal service stress of the member under detection based on the ultrasonic echoes is carried out by a peripheral device, which does not belong to the content of the disclosure and is not described herein.

DESCRIPTION OF REFERENCE SIGNS

10—Ultrasonic probe, 11—Acoustic impedance matching layer, 20—Magnetic field generating apparatus, 30—Flexible fence, 40—Magnetic fluid, and 50—Member under detection.

DETAILED DESCRIPTION OF THE EMBODIMENTS

The present disclosure provides a device and a method for ultrasonic detecting of mechanical member based on magnetic fluid coupling.

The device and the method of the present disclosure will now be described in detail with reference to the embodiments shown in the accompanying drawings.

Figure 1:
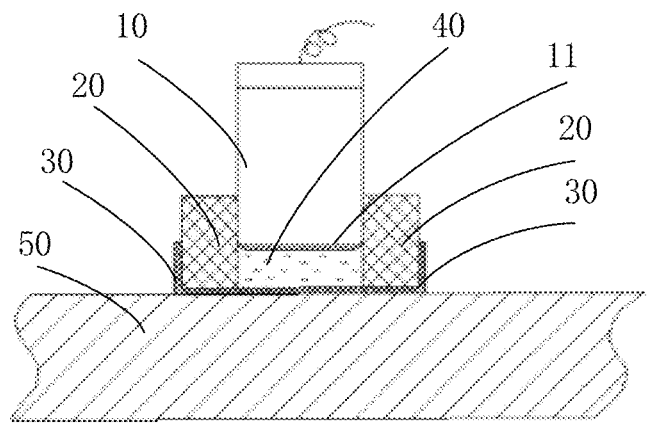
FIG. 1 is a block diagram of a device for ultrasonic detecting according to an embodiment of the present disclosure.
Figure 2:
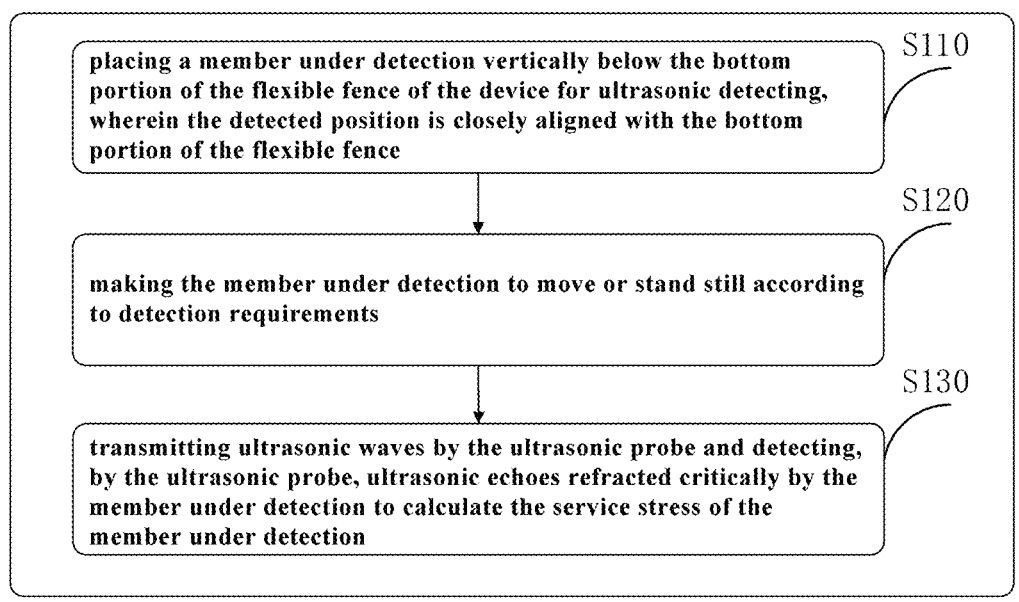
FIG. 2 is a flow chart of a method for ultrasonic detecting according to an embodiment of the present disclosure.

As shown in FIG. 1, the present disclosure provides a device for ultrasonic detecting of mechanical member based on magnetic fluid coupling, which includes a magnetic field ultrasonic probe 10, a magnetic field generating apparatus 20, magnetic fluid 40, and a flexible fence 30.

The magnetic field generating apparatus 20 has a cylindrical structure, such as a vertically hollow circular ring or rectangular structure, and the magnetic fluid 40 is injected into a hollow portion of the apparatus. An upper portion of the apparatus is provided with the ultrasonic probe 10 that vertically extends into a liquid level of the magnetic fluid 40, a bottom portion of the apparatus is sealed by the flexible fence 30, and the flexible fence 30 vertically covers a detected position of the member 50 under detection.

Wherein, the magnetic field generating apparatus 20 may be made of a permanent magnet, which has an inner wall completely matched with a shape of a front end of the ultrasonic probe 10, a depth of 1-5 mm, and a bottom portion whose curvature is matched with that of the member 50 under detection.

Wherein, the magnetic fluid 40 may at least include magnetic suspension particles and oil-based or water-based liquid, and contain thickeners, antioxidants or antiseptics.

Wherein, a front end of the ultrasonic probe 10 is provided with an acoustic impedance matching layer 11 matched with an acoustic impedance of the magnetic fluid 40, a thickness of the acoustic impedance matching layer 11 is smaller than or equal to ¼ ultrasonic wave length, and a surface of a piezoelectric ceramic of a ultrasonic transducer of the ultrasonic probe 10 is provided with a chamfer.

Wherein, a periphery of the flexible fence 30 extends upward along an outer wall of the magnetic field generating apparatus 20, and tightly encloses a lower half part of the outer wall of the magnetic field generating apparatus 20.

The working principle of the device for ultrasonic detecting of mechanical member based on magnetic fluid coupling is described below.

The magnetic fluid 40 couples the ultrasonic probe 10 and the detected position of the member 50 under detection.

The magnetic field generating apparatus 20 provides a semi-closed magnetic field, by which the suspended particles protruding from the surface of the magnetic fluid 40 are attracted and attached to the acoustic impedance matching layer 11 of the ultrasonic probe 10 and do not fall off therefrom. The flexibility of the flexible fence 30 realizes close contact with the magnetic fluid 40 and the surface of the member 50 under detection, thus further enhancing the coupling between the ultrasonic probe 10 and the member 50 under detection.

The ultrasonic probe 10 transmits ultrasonic waves that are transmitted to the detected position of the member 50 under detection and enter the interior of the member 50 under detection by utilizing the acoustic permeability of the magnetic fluid 40, ultrasonic echoes are refracted critically through the inside of the member 50 under detection to calculate the service stress of the member under detection, and the ultrasonic echoes are detected by the ultrasonic probe 10, which realizes the ultrasonic detection of the internal service stress of the member 50 under detection.

The advantages of the device for ultrasonic detecting of mechanical member based on magnetic fluid coupling are described below.

Wherein, the acoustic impedance matching layer 11 is matched with the acoustic impedance of the magnetic fluid 40, which reduces the propagation loss between the ultrasonic probe 10 and the magnetic fluid 40, improve the signal-to-noise ratio of ultrasonic propagation, and improve the accuracy of the detection. Particularly, when the thickness of the acoustic impedance matching layer 11 is ¼ wavelength of the ultrasonic waves used for detection or thinner, the propagation loss between the ultrasonic probe 10 and the magnetic fluid 40 is reduced, and the accuracy of the detection is further improved.

Wherein, the chamfer angle on the surface edge of the piezoelectric ceramic piece of the ultrasonic transducer of the ultrasonic probe 10 reduces the noise of the ultrasonic transducer of the ultrasonic probe 10, improves the sensitivity of the detection and improves the accuracy of the detection.

Wherein, the magnetic suspension particles of the magnetic fluid 40 are in micro-nano scale, which improves the sound permeability of the magnetic fluid 40.

Wherein, the magnetic fluid 40 contains thickeners, which can increase the density of the magnetic fluid 40 and reduce the transmission loss of the ultrasonic waves in the magnetic fluid 40.

Wherein, the magnetic fluid 40 contains antioxidants or antiseptics, which can extend the life of the magnetic fluid 40.

Wherein, the inner wall of the magnetic field generating apparatus 20 is completely matched with the front end of the ultrasonic probe 10 in shape, which keeps the magnetic fluid 40 from leaking upwards, and improves the stability of the detection.

Wherein, the depth of the magnetic field generating apparatus is 1-5 mm, and the depth can be adjusted according to the intensity of the magnetic field generated by the magnetic field generating apparatus 20.

Wherein, the curvature of the bottom portion of the magnetic field generating apparatus 20 matches the curvature of the surface of the member 50 under detection, which keeps the magnetic fluid 40 from leaking, and improves the stability of the detection.

Wherein, the periphery of the flexible fence 30 extends upward along the outer wall of the magnetic field generating apparatus 20, and tightly surrounds the lower half part of the outer wall of the magnetic field generating apparatus 20, thus fixing the whole device.

In the present disclosure, the magnetic fluid 40 is attracted and attached to the acoustic impedance matching layer 11 of the ultrasonic probe 10 by utilizing the magnetic field generated by the annular magnetic field generating apparatus 20, and meanwhile, the magnetic fluid 40 is kept to be closely attached to the flexible fence 30 which closely covers the member 50 under detection, thus coupling the ultrasonic probe 10 and the member 50 under detection. The ultrasonic probe 10 transmits and receives the ultrasonic signals by utilizing the sound permeability of the magnetic fluid 40, which realizes ultrasonic nondestructive detecting of the mechanical member. Finally, combination of the flexibility of the flexible fence 30 and the impermeability to the magnetic fluid 40 maintains the thickness and concentration of the magnetic fluid 40, and realizes the ultrasonic detecting of the moving member.

An embodiment of the present disclosure also provides a method for ultrasonic detecting of mechanical member based on magnetic fluid coupling, which may include steps S110 to S130.

At the step S110, the member 50 under detection is vertically placed below a bottom portion of the flexible fence 30 of the device for ultrasonic detecting of mechanical member based on magnetic fluid coupling, wherein the detected position is closely aligned with the bottom portion of the flexible fence 30.

At the step S120, the member 50 under detection is made to move or stand still according to detection requirements.

At the step S130, the ultrasonic probe 10 transmits ultrasonic waves, and detects ultrasonic echoes critically refracted by the member 50 under detection to calculate the service stress of the member under detection.

Calculating of the service stress of the member under detection based on the ultrasonic echoes is carried out by a peripheral device, which does not belong to the content of the present disclosure and is not described herein.

The above description is only for the purpose of illustrating the preferred embodiments of the present disclosure and is not intended to limit the scope of the present disclosure. Any modifications, equivalents and improvements, which are made within the spirit and principle of the present disclosure, should be included in the scope of protection of the present disclosure.

What is claimed is:

1. A device for ultrasonic detecting a mechanical member based on magnetic fluid coupling, comprising a magnetic field generating apparatus, magnetic fluid and an ultrasonic probe;

the magnetic field generating apparatus has a cylindrical structure, into which the magnetic fluid is injected, wherein an upper portion of the apparatus is provided with the ultrasonic probe a front end of which vertically extends into a liquid level of the magnetic fluid, and a bottom portion of the apparatus covers a detected position of the member under detection; and the magnetic fluid at least contains magnetic suspension particles and an oil-based or water-based liquid, wherein the device further comprises a flexible fence for sealing the bottom portion of the magnetic field generating apparatus, by which the detected position of the member under detection is covered, wherein the flexible fence is made of soft sound-transmitting materials.

2. The device of claim 1, wherein the magnetic field generating apparatus comprises a cylindrical permanent magnet frame.

3. The device of claim 2, wherein an inner wall of the magnetic field generating apparatus is matched in shape with the front end of the ultrasound probe.

4. The device of claim 2, wherein the magnetic field generating apparatus has a depth of 1-5 mm.

5. The device of claim 2, wherein a curvature of the bottom portion of the magnetic field generating apparatus is matched with a corresponding position of the member under detection.

6. The device of claim 1, wherein the front end of the ultrasonic probe has an acoustic impedance matching layer that matches acoustic impedance of the magnetic fluid.

7. The device of claim 1, wherein the magnetic fluid further contains thickeners.

8. The device of claim 1, wherein a periphery of the flexible fence extends upwards along an outer wall of the magnetic field generating apparatus and tightly surrounds a lower half part of the outer wall of the magnetic field generating apparatus.

\* \* \* \* \*